US007540609B2

(12) United States Patent
Chen et al.

(10) Patent No.: US 7,540,609 B2
(45) Date of Patent: *Jun. 2, 2009

(54) WETTABLE SILICONE HYDROGEL CONTACT LENSES AND RELATED COMPOSITIONS AND METHODS

(75) Inventors: Charlie Chen, San Ramon, CA (US); Ye Hong, Pleasanton, CA (US); Nick Manesis, San Ramon, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 11/761,272

(22) Filed: Jun. 11, 2007

(65) Prior Publication Data

US 2007/0291223 A1 Dec. 20, 2007

Related U.S. Application Data

(60) Provisional application No. 60/804,911, filed on Jun. 15, 2006, provisional application No. 60/887,513, filed on Jan. 31, 2007, provisional application No. 60/894,609, filed on Mar. 13, 2007.

(51) Int. Cl.
| | |
|---|---|
| G02C 7/04 | (2006.01) |
| G02B 1/04 | (2006.01) |
| C08F 290/08 | (2006.01) |
| C08G 77/04 | (2006.01) |

(52) U.S. Cl. .............. 351/160 R; 351/160 H; 351/162; 523/106; 523/107; 528/26

(58) Field of Classification Search .............. 523/106, 523/107, 108; 351/160 H, 160 R, 162; 528/26
See application file for complete search history.

(56) References Cited

U.S. PATENT DOCUMENTS

| | | | |
|---|---|---|---|
| 4,711,943 | A | 12/1987 | Harvey, III |
| 5,260,000 | A | 11/1993 | Nandu et al. |
| 5,274,008 | A | 12/1993 | Lai |
| 5,352,714 | A | 10/1994 | Lai et al. |
| 5,358,995 | A | 10/1994 | Lai et al. |
| 5,451,617 | A | 9/1995 | Lai et al. |
| 5,486,579 | A | 1/1996 | Lai et al. |
| 5,610,252 | A | 3/1997 | Bambury et al. |
| 5,760,100 | A | 6/1998 | Nicolson et al. |
| 5,965,631 | A * | 10/1999 | Nicolson et al. ............ 523/106 |
| 5,998,498 | A | 12/1999 | Vanderlaan et al. |
| 6,187,835 | B1 * | 2/2001 | Szum et al. .................... 522/96 |
| 6,367,929 | B1 | 4/2002 | Maiden et al. |
| 6,420,453 | B1 | 7/2002 | Bowers et al. |
| 6,533,415 | B2 | 3/2003 | Watanabe |
| 6,638,991 | B2 | 10/2003 | Baba et al. |
| 6,649,722 | B2 | 11/2003 | Rosenzweig et al. |
| 6,822,016 | B2 | 11/2004 | McCabe et al. |
| 6,849,671 | B2 | 2/2005 | Steffen et al. |
| 6,867,245 | B2 | 3/2005 | Iwata et al. |
| 7,037,954 | B2 | 5/2006 | Baba et al. |
| 7,052,131 | B2 | 5/2006 | McCabe et al. |
| 7,064,174 | B2 | 6/2006 | Lewis et al. |
| 2002/0016383 | A1 | 2/2002 | Iwata et al. |
| 2003/0109637 | A1 | 6/2003 | Kunzler et al. |
| 2003/0162862 | A1 * | 8/2003 | McCabe et al. ............. 523/106 |
| 2004/0186248 | A1 | 9/2004 | Vanderlaan et al. |
| 2004/0192872 | A1 * | 9/2004 | Iwata et al. .................... 528/25 |
| 2005/0013842 | A1 | 1/2005 | Qiu et al. |
| 2005/0059770 | A1 * | 3/2005 | Srinivasan et al. .......... 524/494 |
| 2006/0063852 | A1 | 3/2006 | Iwata et al. |
| 2006/0131769 | A1 | 6/2006 | Rastogi et al. |
| 2006/0142410 | A1 * | 6/2006 | Baba et al. .................. 523/106 |
| 2006/0142525 | A1 | 6/2006 | Lai et al. |
| 2007/0037944 | A1 * | 2/2007 | Almond et al. ............. 526/264 |
| 2007/0066706 | A1 | 3/2007 | Manesis et al. |
| 2007/0296914 | A1 | 12/2007 | Chen et al. |
| 2008/0048350 | A1 | 2/2008 | Chen et al. |

FOREIGN PATENT DOCUMENTS

| | | |
|---|---|---|
| EP | 0 395 583 B1 | 10/1990 |
| EP | 0 819 258 B1 | 1/1998 |
| EP | 0 989 418 A2 | 3/2000 |
| EP | 1 752 058 A1 | 2/2007 |
| EP | 1 752 796 A2 | 2/2007 |
| EP | 1 752 816 A1 | 2/2007 |
| WO | WO-91/04283 A1 | 4/1991 |
| WO | WO-93/09154 A1 | 5/1993 |
| WO | WO-01/57047 A1 | 8/2001 |
| WO | WO-01/57048 A1 | 8/2001 |

(Continued)

OTHER PUBLICATIONS

European Search Report for European Application No. 07002505.1 (Jun. 19, 2007).
European Search Report for European Application No. 07252444.0 (Oct. 10, 2007).
European Search Report for European Application No. 07252445.7 (Oct. 10, 2007).
European Search Report for European Application No. 07252446.5 (Oct. 10, 2007).
Willis et al., "A Novel Phosphorylcholine-Coated Contact Lens for Extended Wear Use", *Biomaterials*, 22:3761-3772 (2001).
Office Action from the U.S. Patent and Trademark Office dated Apr. 21, 2008 received in corresponding U.S. Appl. No. 11/761,332 (21 pages).

(Continued)

*Primary Examiner*—Michael Pepitone
(74) *Attorney, Agent, or Firm*—Kilyk & Bowersox, P.L.L.C.

(57) ABSTRACT

Silicone hydrogel contact lenses having ophthalmically acceptable surface wettabilities are obtained from pre-extracted polymerized silicone hydrogel contact lens products produced from a polymerizable composition comprising a combination of particular components. The silicone hydrogel contact lenses can be obtained from non-polar resin based contact lens molds and without surface treatments or an interpenetrating polymeric network of a polymeric wetting agent. Related lens products, polymerizable compositions, and methods are also described.

23 Claims, 1 Drawing Sheet

FOREIGN PATENT DOCUMENTS

| | | | |
|---|---|---|---|
| WO | WO-2004/060099 | A2 | 7/2004 |
| WO | WO-2004/060099 | A3 | 7/2004 |
| WO | WO 2004063795 | A1 * | 7/2004 |
| WO | WO-2004/081105 | A2 | 9/2004 |
| WO | WO-2004/081105 | A3 | 9/2004 |
| WO | WO-2006/026474 | A2 | 3/2006 |
| WO | WO-2006/026474 | A3 | 3/2006 |
| WO | WO-2007/061919 | A2 | 5/2007 |
| WO | WO-2007/061919 | A3 | 5/2007 |

OTHER PUBLICATIONS

Office Action from the U.S. Patent and Trademark Office dated Aug. 6, 2008 received in corresponding U.S. Appl. No. 11/761,324 (12 pages).

Office Action from the U.S. Patent and Trademark Office dated Jan. 9, 2009 received in corresponding U.S. Appl. No. 11/761,324 (6 pages).

Office Action from the U.S. Patent and Trademark Office dated Mar. 5, 2009 received in corresponding U.S. Appl. No. 11/761,324 (6 pages).

Office Action from the U.S. Patent and Trademark Office dated Jan. 8, 2009 received in corresponding U.S. Appl. No. 11/761,332 (23 pages).

Office Action from the U.S. Patent and Trademark Office dated Dec. 23, 2008 received in corresponding U.S. Appl. No. 11/213,437 (25 pages).

* cited by examiner

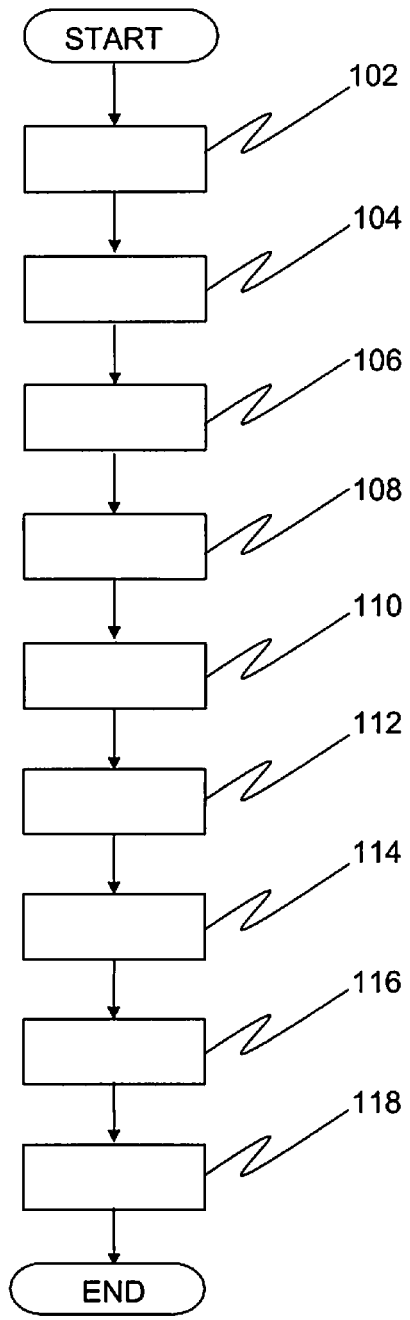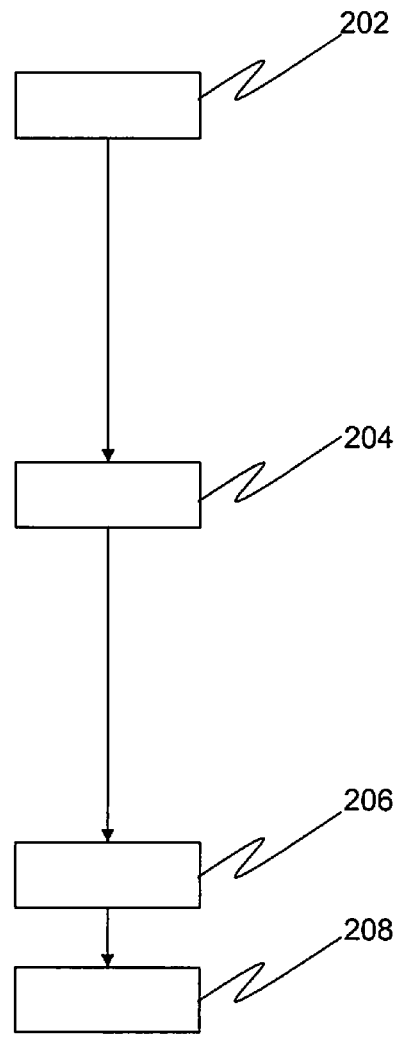
FIG. 1   FIG. 2

WETTABLE SILICONE HYDROGEL CONTACT LENSES AND RELATED COMPOSITIONS AND METHODS

CROSS-REFERENCE TO RELATED APPLICATIONS

This application claims the benefit of U.S. Application No. 60/804,911, filed Jun. 15, 2006; U.S. Application No. 60/887,513, filed Jan. 31, 2007; and U.S. Application No. 60/894,609, filed Mar. 13, 2007, the entire contents of which are hereby incorporated by reference.

FIELD

The present invention is directed to silicone hydrogel ophthalmic devices and related compositions and methods, among other aspects. More particularly, the present invention relates to wettable molded silicone hydrogel contact lenses, and related compositions and methods.

BACKGROUND

Silicone hydrogel contact lenses have become popular due to the ability of contact lens wearers to wear such lenses on their eyes for longer times compared to non-silicone hydrogel contact lenses. For example, depending on the particular lens, silicone hydrogel contact lenses can be worn or prescribed for daily wear, weekly wear, biweekly wear, or monthly wear. Benefits to lens wearers associated with silicone hydrogel contact lenses can be attributed, at least in part, to the combination of hydrophilic components and the hydrophobic properties of silicon-containing polymeric materials of the contact lenses.

Non-silicone hydrogel contact lenses, such as 2-hydroxyethylmethacrylate (HEMA) based hydrogel contact lenses, are often produced in non-polar resin contact lens molds, for example, contact lens molds produced from polyolefin-based resins. Lens precursor compositions for non-silicone hydrogel contact lenses are polymerized in non-polar resin contact lens molds to produce HEMA-based polymeric or polymerized lens products. Due to the hydrophilic nature of the polymeric components of HEMA-based contact lenses, the HEMA-based lenses are ophthalmically compatible and have ophthalmically acceptable surface wettabilities, even in spite of being produced using non-polar resin molds.

In contrast, existing silicone hydrogel contact lenses obtained from non-polar resin molds have hydrophobic lens surfaces. In other words, the surfaces of such silicone hydrogel contact lenses have low wettability and therefore are not ophthalmically compatible or ophthalmically acceptable. For example, such silicone hydrogel contact lenses may be associated with less than desirable features such as increased lipid deposition, protein deposition, lens binding to the ocular surface, and general irritation to a lens wearer.

In an effort to overcome these problems, surface treatment or surface modification of silicone hydrogel contact lenses or lens products has been employed in an attempt to increase the hydrophilicity and wettability of the lens surfaces. Examples of surface treatment of silicone hydrogel lenses include coating a surface of the lens, adsorbing chemical species onto the surface of the lens, and altering the chemical nature or electrostatic charge of chemical groups on the surface of the lens. Surface treatments have been described which include using a plasma gas to coat the surface of a polymerized lens, or using a plasma gas on a contact lens mold surface to treat the mold prior to forming a polymerized lens. Unfortunately, several drawbacks are associated with this approach. Surface treatment of contact lenses requires more machinery and time to produce contact lenses compared to manufacturing methods that do not use surface treatments or modifications. In addition, surface treated silicone hydrogel contact lenses can exhibit a decreased surface wettability as the lens is being worn and/or handled by the lens wearer. For example, increased handling of a surface treated lens can result in the hydrophilic surface being degraded or worn away.

An alternative approach to increasing the wettability and ophthalmic compatibility of silicone hydrogel lenses is to polymerize a silicone hydrogel contact lens precursor composition in the presence of a second composition that comprises a polymeric wetting agent, such as polyvinylpyrrolidone (PVP). These types of lenses are referred to herein as silicone hydrogel contact lenses with polymeric internal wetting agents, and typically comprise an interpenetrating polymer network (IPN) that includes a high molecular weight polymer, such as PVP. As understood by persons of ordinary skill in the art, an IPN refers to a combination of two or more different polymers, in network form, at least one of which is synthesized and/or cross-linked in the presence of the other without any covalent bonds between them. An IPN can be composed of two kinds of chains forming two separate networks, but in juxtaposition or interpenetrating. Examples of IPNs include sequential IPNs, simultaneous IPNs, semi-IPNs and homo-IPNs. Although silicone hydrogel contact lenses that include an IPN of a polymeric wetting agent avoid the problems associated with surface treatment, these lenses may not retain their ophthalmic compatibility, including surface wettability, for prolonged periods of time. For example, internal wetting agents, since they are not covalently bound to the other polymerized lens forming components, may leach out from the lens while being worn by a lens wearer, and thereby lead over time to a decreased surface wettability and increased discomfort to the lens wearer.

As an alternative to surface treatment or use of a polymeric wetting agent IPN, as described above, it has been found that silicone hydrogel contact lenses with ophthalmically acceptable surface wettabilities can be produced using polar resin molds instead of non-polar resin molds. For example, silicone hydrogel contact lenses formed in ethylene-vinyl alcohol or polyvinyl alcohol based molds have desirable surface wettabilities. One example of a useful polar resin used in the manufacture of contact lens molds for producing non-surface treated silicone hydrogel contact lenses free of an IPN of a polymeric wetting agent is a resin of ethylene-vinyl alcohol copolymers such as the ethylene-vinyl alcohol copolymer resin sold under the trade name SOARLITE™ by Nippon Gohsei, Ltd. In addition to its polarity, SOARLITE™ is described as possessing the following characteristics: extremely high mechanical strength, antistatic properties, low contractility when used in molding processes, excellent oil and solvent resistance, small coefficient of thermal expansion, and good abrasion resistance.

Although SOARLITE™-based molds provide a desirable alternative for producing ophthalmically compatible silicone hydrogel contact lenses without the use of a surface treatment or a polymeric wetting agent IPN, SOARLITE™ molds are less deformable or flexible than non-polar resin molds, such as polypropylene molds, and are relatively more difficult to work with compared to non-polar resin molds.

In view of the above, it can be seen that a need exists for ophthalmically compatible silicone hydrogel contact lenses that can be more easily produced compared to silicone hydrogel contact lenses obtained from SOARLITE™ contact lens molds, and that do not require surface treatment or use of a polymeric wetting agent IPN, including a PVP IPN, to achieve ophthalmic compatibility. Additionally, it would be highly desirable to provide a method for producing an ophthalmically compatible silicone hydrogel contact lens, such as a silicone hydrogel contact lens having an ophthalmically compatible surface wettability, from non-polar resin or polyolefin-based contact lens mold members, which overcomes the disadvantages of current manufacturing approaches. That is to say, there is a need for an improved method for preparing an ophthalmically compatible silicone hydrogel contact lens that requires neither surface treatment of the resulting contact lens product nor the use of a polymeric wetting agent IPN as part of a polymerizable silicone hydrogel contact lens precursor composition to provide a lens product having features attributable to extended comfort. The present invention meets these needs.

SUMMARY

The contact lenses, lens products, compositions, and methods of the present invention address the needs and problems associated with existing silicone hydrogel contact lenses and their current methods of production. It has been surprisingly discovered that ophthalmically compatible silicone hydrogel contact lenses are obtained by combining certain components to provide a polymerizable composition, which, upon polymerization, provides a pre-extracted polymerized silicone hydrogel contact lens product having one or more particularly desirable features. In one or more embodiments, the hydrogel contact lens product possesses about 10% or more by weight extractable components pre-extraction. In certain embodiments, the extractable content of the pre-extracted silicone hydrogel contact lens product is at least about 20% by weight. For example, a pre-extracted silicone hydrogel contact lens product may have an extractable content from about 22% to about 30% by weight. In at least one specific embodiment, a pre-extracted silicone hydrogel contact lens product has an extractable content of about 26% by weight. In one or more embodiments of the present products and methods, provided herein is a silicone hydrogel contact lens product that does not employ a polyalkylene oxide silicone extractable component, but which advantageously leads to compositions and lenses having distinct and desirable characteristics when compared to existing lenses.

Features of the silicone hydrogel contact lens provided herein include an ophthalmically acceptable surface wettability, as described herein. Additionally, the silicone hydrogel contact lenses of the present invention have an oxygen permeability, a surface wettability, a modulus, a water content, ionoflux, and design which permit the lenses to be comfortably worn on a patient's eye for extended periods of time, such as for at least a day, at least a week, at least two weeks, or about a month without requiring removal of the lens from the eye.

In one aspect, the present invention is directed to a polymerizable silicone hydrogel contact lens precursor composition. Such precursor compositions are effective to form silicone hydrogel contact lenses.

In one aspect in particular, provided herein is a polymerizable composition comprising, consisting essentially of, or consisting entirely of, the following components: α-ω-bis (methacryloyloxyethyl iminocarboxy ethyloxypropyl)-poly (dimethylsiloxane)-poly(trifluoropropylmethylsiloxane)-poly (ω-methoxy-poly(ethyleneglycol) propylmethylsiloxane), N-vinyl-N-methylacetamide, methylmethacrylate, ethylene glycol dimethacrylate, allyloxy alcohol, and a free radical initiator.

In one or more embodiments, the polymerizable composition further comprises an ultraviolet absorber, such as 2-hydroxy-4-acryloyloxyethoxy benzophenone, among others.

In one or more additional embodiments, the polymerizable composition further comprises a tinting agent, for example, a phthalocyanine pigment such as phthalocyanine blue, among others.

In yet one or more further embodiments, the free radical initiator comprised in the polymerizable composition is 2,2'-azobisisobutyronitrile.

The invention further includes any one or more of the polymerizable compositions described above comprising about 34 percent by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane).

In yet one or more additional embodiments, the polymerizable composition may comprise any one or more of the following: (i) about 46 percent by weight N-vinyl-N-methylacetamide, (ii) about 17 percent by weight methylmethacrylate, (iii) about 0.5 percent by weight ethylene glycol dimethacrylate, and (iv) about 1 percent by weight allyloxy alcohol.

In yet one or more additional embodiments, the polymerizable composition comprises about 0.9 percent by weight 2-hydroxy-4-acryloyloxyethoxy benzophenone.

In yet one or more further embodiments, the polymerizable composition comprises about 0.1 percent by weight phthalocyanine blue.

In yet one or more further embodiments, the polymerizable composition comprises about 0.3 weight percent free radical initiator.

In yet one another particular embodiment, the polymerizable composition comprises about 34 percent by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), about 46 percent by weight N-vinyl-N-methylacetamide, about 17 percent by weight methylmethacrylate, about 0.5 percent by weight ethylene glycol dimethacrylate, about 1 percent by weight allyloxy alcohol, about 0.9 percent by weight 2-hydroxy-4-acryloyloxyethoxy benzophenone, about 0.1 percent by weight phthalocyanine blue, and about 0.3 percent by weight 2,2'-azobisisobutyronitrile.

In yet another embodiment, provided is any one or more of the polymerizable compositions described herein absent a polyalkylene oxide silicone extractable component.

In yet another aspect, provided is a silicone hydrogel contact lens produced from a polymerizable composition as provided herein.

Also provided is a silicone hydrogel contact lens formed from a polymerizable composition as described herein, substantially free of extractable components.

Also forming part of the invention is a silicone hydrogel contact lens produced by polymerizing a polymerizable composition as provided herein to form a pre-extracted polymerized silicone hydrogel contact lens comprising extractable components, extracting the extractable components from the pre-extracted contact lens to form an extracted polymerized lens product, and hydrating the extracted polymerized lens product to form a silicone hydrogel contact lens.

In one or more embodiments, a silicone hydrogel contact lens produced as described above possesses an equilibrium water content in the range of about 42% to about 50% by weight and an oxygen permeability ($D_k \times 10^{-11}$) ranging from about 80-110 barrers.

In one or more additional embodiments, a silicon hydrogel contact lens produced as described above possesses a modulus from about 0.6 to about 1.2 MPa.

In yet one or more further embodiments, provided is a silicone hydrogel contact lens produced as described above, where the polymerizing step comprises heating the polymerizable composition to a temperature greater than about 65° C.

In yet another aspect, provided herein is a silicone hydrogel contact lens having an equilibrium water content in the range of about 42% to about 50% by weight, an oxygen permeability ($D_k \times 10^{-11}$) ranging from about 80-110 barrers, a modulus from about 0.6 to about 1.2 MPa, an ionoflux from about 1-5 ($\times 10^{-3}$ mm$^2$/min), an advancing contact angle from about 52 to about 62 degrees, a receding contact angle from about 40 to 60 degrees, and a hysteresis from about 5 to about 15 degrees.

In one or more embodiments, a silicon hydrogel contact lens as described herein is additionally characterized by a lens body having a rounded peripheral edge.

In yet one or more additional embodiments, a silicone hydrogel contact lens of the invention may be (i) a spheric lens, (ii) an aspheric lens, (iii) a monofocal lens, (iv) a multifocal lens, or (v) a rotationally stabilized toric contact lens.

In yet one or more further embodiments, a silicone hydrogel contact lens of the invention is in a sealed package.

In yet one or more additional embodiments, a silicone hydrogel contact lens as provided herein is non-surface treated.

In yet another aspect, provided herein is a method for producing a polymerizable silicone hydrogel contact lens precursor composition. In one or more embodiments, the method comprises combining α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), N-vinyl-N-methylacetamide, methylmethacrylate, ethylene glycol dimethacrylate, allyloxy alcohol, and a free radical initiator, to thereby produce a polymerizable silicone hydrogel contact lens precursor composition.

In one or more embodiments of the method, the combining step additionally includes an ultraviolet absorber.

In yet one or more particular embodiments, the combining step additionally includes 2-hydroxy-4-acryloyloxyethoxy benzophenone.

In one or more additional embodiments of the method, the combining step additionally includes a tinting agent, for instance, a phthalocyanine pigment such as phthalocyanine blue.

In yet one or more particular embodiments of the method, the free radical initiator is 2,2'-azobisisobutyronitrile.

In yet one or more particular embodiments, the method comprises combining:
(i) about 30 to 40 percent by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane),
(ii) about 40 to 50 percent by weight N-vinyl-N-methylacetamide,
(iii) about 10 to 25 percent by weight methylmethacrylate, and
(iv) less than about 5% by weight combined of ethylene glycol dimethacrylate, allyloxy alcohol, 2-hydroxy-4-acryloyloxyethoxy benzophenone, phthalocyanine blue, and 2,2'-azobisisobutyronitrile.

In yet one or more additional embodiments of the method, the combining step comprises combining about 34 percent by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), about 46 percent by weight N-vinyl-N-methylacetamide, about 17 percent by weight methylmethacrylate, about 0.5 percent by weight ethylene glycol dimethacrylate, about 1 percent by weight allyloxy alcohol, about 0.9 percent by weight 2-hydroxy-4-acryloyloxyethoxy benzophenone, about 0.1 percent by weight phthalocyanine blue, and about 0.3 percent by weight 2,2'-azobisisobutyronitrile to thereby provide a polymerizable silicone hydrogel contact lens precursor composition.

In yet one or more further embodiments, the method further comprises polymerizing the polymerizable lens precursor composition to form a pre-extracted polymerized silicone hydrogel contact lens.

In one or more particular embodiments of the method, the polymerizing step comprises heating the polymerizable lens precursor composition.

In yet one or more additional embodiments, the method further comprises, prior to the polymerization step, placing the polymerizable lens precursor composition in a non-polar resin contact lens mold.

In yet one or more further embodiments, the method further comprises extracting the pre-extracted polymerized contact lens to form an extracted polymerized lens product substantially absent extractable components, and hydrating the extracted polymerized lens product to form a silicone hydrogel contact lens.

In yet another aspect, provided herein is a silicone hydrogel contact lens comprising the reaction product of a polymerizable composition as described herein, substantially free of extractable components.

Additional embodiments of the present lenses, lens products, compositions and methods will be apparent from the following description, drawings, examples, and claims. As can be appreciated from the foregoing and following description, each and every feature described herein, and each and every combination of two or more of such features, is included within the scope of the present invention provided that the features included in such a combination are not mutually inconsistent. In addition, any feature or combination of features may be specifically excluded from any embodiment of the present invention. Additional aspects and advantages of the present invention are set forth in the following description and claims, particularly when considered in conjunction with the accompanying examples and drawings.

BRIEF DESCRIPTION OF THE DRAWINGS

FIG. 1 is a block diagram illustrating an exemplary method for producing a silicone hydrogel contact lens.

FIG. 2 is a block diagram illustrating compositions, lens products, and contact lenses of the invention.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

It must be noted that, as used in this specification, the singular forms "a," "an," and "the" include plural referents unless the context clearly dictates otherwise. Thus, for example, reference to a "contact lens" includes a single lens as well as two or more of the same or different lenses, reference to a "precursor composition" refers to a single composition as well as two or more of the same or different compositions, and the like.

In describing and claiming the present invention, the following terminology will be used in accordance with the definitions described below.

As used herein, the term "hydrogel" refers to a polymeric material, typically a network or matrix of polymer chains, capable of swelling in water or becoming swollen with water. The network or matrix may or may not be cross-linked. Hydrogels refer to polymeric materials, including contact lenses, that are water swellable or are water swelled. Thus, a hydrogel may be (i) unhydrated and water swellable, or (ii) partially hydrated and swollen with water, or (iii) fully hydrated and swollen with water.

The term "substituted" as in, for example, "substituted alkyl," refers to a moiety (e.g., an alkyl group) substituted with one or more non-interfering substituents, such as, but not limited to: $C_3$-$C_8$ cycloalkyl, e.g., cyclopropyl, cyclobutyl, and the like; halo, e.g., fluoro, chloro, bromo, and iodo; cyano; alkoxy, lower phenyl; substituted phenyl; and the like. For substitutions on a phenyl ring, the substituents may be in any orientation (i.e., ortho, meta, or para).

The term "silicone hydrogel" or "silicone hydrogel material" refers to a particular hydrogel that includes a silicon (Si) component or a silicone component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material. The properties of a silicone hydrogel contact lens are distinct from conventional hydrogel-based lenses.

A "silicone-containing component" is a component that contains at least one [—Si—O—Si] linkage, in a monomer, macromer or prepolymer, wherein each silicon atom may optionally possess one or more organic radical substituents ($R_1$, $R_2$) or substituted organic radical substituents that may be the same as different, e.g., —$SiR_1R_2O$—.

"Optional" or "optionally" means that the subsequently described circumstance may or may not occur, so that the description includes instances where the circumstance occurs and instances where it does not.

"Molecular mass" in the context of a polymer of the invention refers to the nominal average molecular mass of a polymer, typically determined by size exclusion chromatography, light scattering techniques, or intrinsic velocity determination in 1,2,4-trichlorobenzene. Molecular weight in the context of a polymer can be expressed as either a number-average molecular weight or a weight-average molecular weight, and in the case of vendor-supplied materials, will depend upon the supplier. Typically, the basis of any such molecular weight determinations can be readily provided by the supplier if not provided in the packaging material. Typically, references herein to molecular weights of macromers or polymers herein refer to the weight average molecular weight. Both molecular weight determinations, number-average and weight-average, can be measured using gel permeation chromatographic or other liquid chromatographic techniques. Other methods for measuring molecular weight values can also be used, such as the use of end-group analysis or the measurement of colligative properties (e.g., freezing-point depression, boiling-point elevation, or osmotic pressure) to determine number-average molecular weight or the use of light scattering techniques, ultracentrifugation or viscometry to determine weight-average molecular weight.

A "network" or "matrix" of a hydrophilic polymer typically means that crosslinks are formed between the polymer chains by covalent bonds or by physical bonds, e.g. hydrogen bonds.

A "hydrophilic" substance is one that is water-loving. Such compounds have an affinity to water and are usually charged or have polar side groups that attract water.

A "hydrophilic polymer" according to the present invention is defined as a polymer capable of swelling in water, however, not necessarily being soluble in water.

A "hydrophilic component" is a hydrophilic substance that may or may not be a polymer. Hydrophilic components include those that are capable of providing at least about 20%, for example, at least about 25% water content to the resulting hydrated lens when combined with the remaining reactive components.

As used herein, an "ophthalmically compatible silicone hydrogel contact lens" refers to a silicone hydrogel contact lens that can be worn on a person's eye without the person experiencing or reporting substantial discomfort, including ocular irritation and the like. Ophthalmically compatible silicone hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort.

"Substantially" or "essentially" or "about" means nearly totally or completely, for instance, 95% or greater of some given quantity.

"Substantially absent" or "substantially free" of a certain feature or entity means nearly totally or completely absent the feature or entity, for example, containing 5% or less of some given entity. For example, a composition that is substantially free of a certain entity can contain less than about 5%, or less than about 4%, less than about 3%, less than about 2%, or even less than about 1% of some given entity.

"Alkyl" refers to a hydrocarbon chain, typically ranging from about 1 to 20 atoms in length. Such hydrocarbon chains are preferably but not necessarily saturated and may be branched or straight chain, although typically straight chain is preferred. Exemplary alkyl groups include methyl, ethyl, propyl, butyl, pentyl, 1-methylbutyl, 1-ethylpropyl, 3-methylpentyl, and the like. As used herein, "alkyl" includes cycloalkyl when three or more carbon atoms are referenced.

An "oligomer" is a molecule consisting of a finite number of monomer subunits, and typically consists of from about 2 to about 8 monomer subunits.

"Lower alkyl" refers to an alkyl group containing from 1 to 6 carbon atoms, and may be straight chain or branched, as exemplified by methyl, ethyl, n-butyl, i-butyl, t-butyl.

Additional definitions may also be found in the sections which follow.

Overview

As discussed previously, the invention provided herein is based, at least in part, upon the discovery/formulation of ophthalmically compatible silicone hydrogel contact lenses that can be prepared using methods which avoid the problems associated with polar resin molds, avoid the need for elaborate and expensive post-polymerization procedures, and circumvent the problems associated with IPNs of polymeric wetting agents. Moreover, the formulations provided herein do not require more than about 30% of a removable or extractable component that is essentially unincorporated into the polymerized silicone hydrogel contact lens product, and is removed, along with other unreacted components, from the resulting molded contact lens product by extraction. For example, ophthalmically acceptable silicone hydrogel contact lenses can be obtained from pre-extracted polymerized silicone hydrogel contact lens products that have an extractable content of at least 10% and less than about 30% of a dehydrated extracted silicone hydrogel contact lens, as discussed herein. In certain embodiments, the lens formulations are free of a polyalkylene oxide silicone component.

Specifically, a method for producing ophthalmically compatible silicone hydrogel contact lenses includes incorporating into a polymerizable silicone contact lens precursor composition a particular combination of components. These materials impart desirable features to the resulting final contact lens to provide an extracted contact lens product, which is then hydrated to result in a final silicone hydrogel contact lens having an ophthalmically acceptable surface wettability, as well as other beneficial features as described herein.

These and other notable aspects of the invention are described and exemplified in detail in the sections that follow.

Components of a Polymerizable Silicone Hydrogel Contact Lens Precursor Composition The silicone hydrogel contact lenses of the invention are typically produced from what is referred to herein as a "polymerizable silicone hydrogel contact lens precursor composition" or a "precursor composition". A precursor composition is a mixture of various reagents used to make a silicone hydrogel contact lens, i.e., a reaction mixture, prior to reaction, which in the present case, is polymerization.

A precursor composition in accordance with the invention typically comprises at least the following components: α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol) propylmethylsiloxane), N-vinyl-N-methylacetamide, methylmethacrylate, ethylene glycol dimethacrylate, allyloxy alcohol, and a free radical initiator. In certain embodiments, the composition consists essentially of the foregoing components. In further embodiments, the compositions consists entirely of the foregoing components.

α-ω-Bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane)

The first component, α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), is a reactive fluoro-containing acryloyl silicone macromer, commonly referred to as "M3U" (CAS Registry Number of 697234-74-5). The macromer is a triblock polymer, i.e., comprising three different siloxane polymer blocks, as shown in the generalized structure below. The central block possesses a trifluoromethyl substituent, while acryloyl moieties are present at each of the termini.

The variables n, m, and h correspond to the number of repeat units of each block, and each independently ranges from about 3 to about 200, while p, the number of ethylene oxide repeat units, ranges from about 2 to about 12. One particularly preferred macromer corresponding to the above structure is one where n ranges from 50 to 200, m ranges from 2 to 50, and h ranges from 1 to 15. In a particularly preferred embodiment, n is about 121, m is about 7.6, h is about 4.4, and p is about 7.4. M3U can be readily synthesized following the procedure set forth in International Patent Publication No. WO 2006/026474, Example 1.

The molecular weight of the silicone macromer component, i.e., M3U, typically ranges from about about 8,000 daltons to about 25,000 daltons, and preferably ranges from about 10,000 daltons to about 20,000 daltons, depending upon the values of the variables n, m, h, and p. One particularly preferred siloxane macromer for use in the present invention possesses a molecular weight of about 16,000 daltons. For example, a macromer may have a weight average molecular weight (Mw) of about 16,200 and a number average molecular weight (Mn) of about 12,800 daltons.

The polymerizable silicone hydrogel precursor compositions provided herein typically contain at least about 25% by weight of α-ω-bis(methacryloyloxyethyl iminocarboxy ethyloxypropyl)-poly(dimethylsiloxane)-poly trifluoropropylmethylsiloxane)-poly (ω-methoxy-poly(ethyleneglycol)propylmethylsiloxane), and more preferably contain at least about 30% by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane). Even more preferably, the polymerizable compositions of the invention contain from about 25% to about 40% by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), or most preferably, from about 30 to about 40% by weight α-ω-bis (methacryloyloxyethyl iminocarboxy ethyloxypropyl)-poly (dimethylsiloxane)-poly (trifluoropropylmethylsiloxane)-poly (ω-methoxy-poly(ethyleneglycol) propylmethylsiloxane). One particularly preferred polymerizable composition comprises about 34% by weight α-ω-bis(methacryloyloxyethyl iminocarboxy ethyloxypropyl)-poly(dimethylsiloxane)-poly trifluoropropylmethylsiloxane)-poly (ω-methoxy-poly(ethyleneglycol)propylmethylsiloxane).

N-Vinyl-N-methylacetamide

A polymerizable composition as provided herein additionally comprises N-vinyl-N-methylacetamide (VMA), a hydrophilic vinyl-containing ($CH_2$=CH—) monomer. The structure of VMA corresponds to $CH_3C(O)N(CH_3)$—CH=$CH_2$.

Additional hydrophilic vinyl-containing monomers that may be incorporated into the materials of the present lenses include the following: N-vinyl lactams (e.g. N-vinyl pyrrolidone (NVP)), N-vinyl-N-ethyl acetamide, N-vinyl-N-ethyl

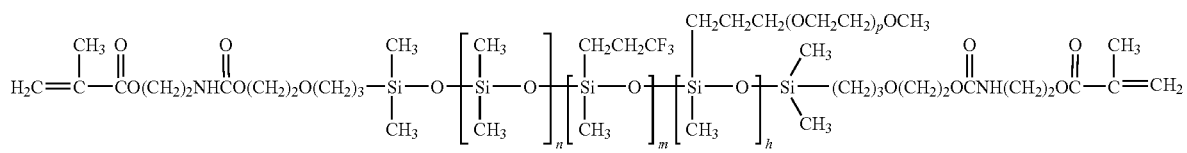

formamide, N-vinyl formamide, N-2-hydroxyethyl vinyl carbamate, N-carboxy-β-alanine N-vinyl ester.

Preferably, N-vinyl-N-methylacetamide is present in the polymerizable composition in an amount ranging from about 35% to about 55% by weight of the precursor composition used to prepare the silicone lens product, and even more preferably is present in an amount ranging from about 40% to about 50% by weight of the precursor composition. Representative weights of N-vinyl-N-methylacetamide include the following: about 40%, 41%, 42%, 43%, 44%, 45%, 46%, 47%, 48%, 49%, or 50% by weight of the precursor composition. In a preferred embodiment, a polymerizable composition as provided herein comprises about 46% by weight N-vinyl-N-methylacetamide.

Methyl Methacrylate (MMA)

A polymerizable precursor composition for preparing a silicone hydrogel contact lens product in accordance with the invention additionally comprises an acrylic monomer such as methyl methyacrylate.

Preferably, methyl methyacrylate is present in an amount ranging from about 10% to about 25% by weight of the precursor composition used to prepare the silicone hydrogel lens product, and even more preferably is present in an amount ranging from about 10% to about 22% by weight of the precursor composition. Illustrative weight percentages of methyl methyacrylate include the following, based on the overall precursor formulation include about 10%, 11%, 12%, 13%, 14%, 15%, 16%, 17%, 18%, 19%, 20%, 21%, 22%, 23%, 24%, and 25%.

Ethylene Glycol Dimethacrylate (EGDMA)

The precursor composition additionally comprises an acrylate-functionalized ethylene oxide oligomer, that is to say, an ethylene oxide oligomer possessing from about 1 to about 8 contiguous ethylene oxide ($CH_2CH_2O$—) monomer subunits, and end-functionalized with a reactive group such as an acrylate. Preferably, the acrylate-functionalized ethylene oxide oligomer is an ethylene oxide monomer or 1-mer, and is homobifunctional, i.e., is end capped at each end with a methacrylate group. A generalized structure is provided below, where the variable s corresponds to the number of ethylene oxide monomers.

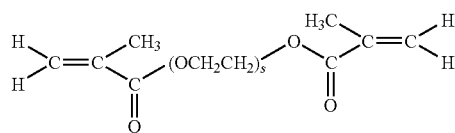

In the preceding structure, s generally ranges from 1 to about 8, preferably from 1 to about 4. That is to say, preferred values of s include 1, 2, 3, 4, 5, 6, 7, and 8. Preferably, the acrylate-functionaled ethylene oxide oligomer is ethylene oxide dimethacrylate, where s has a value of 1.

Typically, the acrylate-functionalized ethylene oxide oligomer, i.e., EGDMA, is present in the precursor composition in relatively small amounts. For instance, the oligomer is present in the precursor composition an amount ranging from about 0.05% by weight to about 10% by weight, preferably from about 0.075% by weight to about 5% by weight. Representative amounts of the EGDMA component include the following: about 0.1%, 0.2%, 0.3%, 0.4%, 0.5%, 0.8%, 0.9%, 1%, 2%, 3%, 4%, or 5% by weight of the precursor composition. In a preferred embodiment, a precursor composition of the invention comprises about 0.5 weight percent EGDMA.

Allyloxy Alcohol

In addition to the above, a polymerizable composition in accordance with the invention comprises a chain transfer reagent. A chain transfer reagent is one that promotes reaction between a radical species and a non-radical species. Preferred for use in the invention are allyloxy compounds, that is, a compound comprising one or more allyloxy moieties. Exemplary chain transfer reagents falling into this classification include include allyloxy alcohols, among others. Chain transfer agents may be used individually or as mixtures.

A compound comprising at least one allyloxy moiety possesses the following generalized structure:

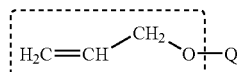

where the boxed portion corresponds to the allyloxy moiety, and Q represents the remainder or residue of the parent molecule, e.g., an alcohol, or any organic small molecule, which, when taken together with the allyoxy moiety, is capable of functioning as a chain transfer agent. Preferably, Q is derived from an alcohol such as ethanol, propanol, butanol, and the like, or substituted versions thereof. Preferably, Q is the residue of ethanol, and possesses the structure (—$CH_2CH_2OH$), such that the chain transfer reagent corresponds to 2-allyloxyethanol.

The inventors have discovered that the inclusion of a chain transfer reagent such as an allyloxy compound is effective to provide extracted, hydrated silicone contact lens bodies having reduced variability in both dimensional and physical properties. Thus, addition of a chain transfer agent functions to "normalize" or "microtune" the precursor lens compositions, such that resulting populations of extracted, hydrated contact lenses typically possess a reduced batch to batch variability in any one or more of the following characteristics: equilibrium water content, oxygen permeability, static contact angle, dynamic contact angle (advancing contact angle or receding contact angle), hysteresis, refractive index, ionoflux, modulus, tensile strength and the like.

A batch or population as used herein refers to a plurality of contact lenses. It can be appreciated that improved statistical values are achieved when the number of contact lenses in the batch or population of contact lenses is sufficient to provide a meaningful standard error. In certain situations, a batch of contact lenses refers to at least 10 contact lenses, at least 100 contact lenses, at least 1000 contact lenses, or more.

Generally, a polymerizable composition as provided herein contains from about 0.1 weight percent to about 5 weight percent of an allyloxy alcohol. Preferably, a polymerizable composition of the invention contains from about 0.5 weight percent to about 3 weight percent of an allyloxy alcohol. That is to say, preferably, a polymerizable composition may contain any one of the following exemplary weight percentages of an allyloxy alcohol such as allyloxyethanol: 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3% by weight, among others.

Free Radical Initiator

In addition to the above, the present precursor composition typically comprises one or more initiator compounds, i.e., a compound capable of initiating polymerization of a precursor composition. Preferred are thermal initiators, i.e., initiators having a "kick-off" temperature. By selecting a thermal initiator with a higher kick-off temperature, and using a relatively small amount of the initiator, it is possible to reduce the ionoflux of the present lenses, which may thereby impact the amount of removable material that is removed or extracted in the extracting step.

For instance, one exemplary thermal initiator that may be employed is VAZO®-64, which corresponds to 2,2'-azobisisobutyronitrile (AIBN), available from DuPont (Wilmington, Del.). All of the VAZO® thermal initiators described herein are available from DuPont (Wilmington, Del.), and are suitable for use in the compositions provided herein. VAZO® thermal initiators are substituted azonitrile compounds that thermally decompose to generate two free radicals per molecule. The half life in solution of VAZO®-64 at 64° C. is ten hours. The grade number for each of the VAZO® initiators, e.g., "64" in the preceding example, corresponds to the Celsius temperature at which the half-life in solution is 10 hours.

Other VAZO® initiators suitable for use in the compositions provided herein include 2,2'-azobis(2,4-dimethylpentanenitrile) (VAZO®-52), 2,2'-azobis(2-methylpropanenitrile), VAZO®67, and azo-bis-isobutyronitrile (VAZO®-88). VAZO®-52 possesses a kick-off temperature of about 50° C., while VAZO®-88) has a kick-off temperature of about 90° C. Additional thermal initiators suitable for use in a polymerizable composition include nitriles such as 1,1'-azobis(cyclohexanecarbonitrile) and 2,2'-azobis(2-methylpropionitrile), as well as other types of initiators such as those available from SigmaAldrich.

Ophthalmically compatible silicone hydrogel contact lenses can be obtained from precursor compositions that comprise from about 0.05 to about 1.0 weight percent, or preferably from about 0.07 weight percent to about 0.7 weight percent of a free radical initiator such as one of the VAZO® initiators described above. Specifically, a precursor composition as described herein preferably contains about 0.07, 0.08, 0.09, 0.1, 0.2, 0.3, 0.4, 0.5, 0.6, or 0.7 weight percent of a free radical initiator.

Additional Components of Silicone Hydrogel Contact Lens Precursor Compositions

The lens precursor compositions of the invention may also include additional components, e.g., an ultraviolet (UV) absorber, or UV radiation or energy absorber, and/or tinting agent.

A UV absorber may be, e.g., a strong UV absorber that exhibits relatively high absorption values in the UV-A range of about 320-380 nanometers, but is relatively transparent above about 380 nm. Examples include photopolymerizable hydroxybenzophenones and photopolymerizable benzotriazoles, such as 2-hydroxy-4-acryloyloxyethoxy benzophenone, commercially available as CYASORB® UV416 from Cytec Industries, 2-hydroxy-4-(2 hydroxy-3-methacrylyloxy) propoxybenzophenone, and photopolymerizable benzotriazoles, commercially available as NORBLOC® 7966 from Noramco. Other photopolymerizable UV absorbers suitable for use in the invention include polymerizable, ethylenically unsaturated triazines, salicylates, aryl-substituted acrylates, and mixtures thereof. Generally speaking, a UV absorber, if present, is provided in an amount corresponding to about 0.5 weight percent of the precursor composition to about 1.5 weight percent of the composition. Particularly preferred are compositions which include from about 0.6 percent to about 1.0 percent by weight UV absorber. Illustrative compositions may contain, e.g., about 0.5%, 0.6%, 0.7%, 0.8%, 0.9%, 1.0%, 1.1%, 1.2%, 1.3, 1.4%, or about 1.5% by weight UV absorber.

The precursor compositions of the invention may also include a tinting agent, although both tinted and clear lens products are contemplated. Preferably, the tinting agent is a reactive dye or pigment effective to provide color to the resulting lens product.

Reactive dyes are those that bond to the silicone hydrogel lens material and do not bleed. Exemplary tinting agents include the following: benzene sulfonic acid, 4-(4,5-dihydro-4-((2-methoxy-5-methyl-4-((2-(sulfooxy)ethyl)sulfonyl) phenyl)azo-3-methyl-5-oxo-1H-pyrazol-1-yl); [2-naphthalenesulfonic acid, 7-(acetylamino)-4-hydroxyl-3-((4-((sulfooxyethyl)sulfonyl)phenyl)azo)-]; [5-((4,6-dichloro-1,3,5-triazin-2-yl)amino-4-hydroxy-3-((1-sulfo-2-naphthalenyl)azo-2,7-naphthalene-disulfonic acid, trisodium salt]; [copper, 29H, 31H-phthalocyaninato(2-)-$N_{29}$, $N_{30}$, $N_{31}$, $N_{32}$)-, sulfo((4((2-sulfooxy)ethyl)sulfonyl)phenyl)amino) sulfonyl derivative]; and [2,7-naphthalenesulfonic acid, 4-amino-5-hydroxy-3,6-bis((4-((2-(sulfooxy)ethyl)sulfonyl) phenyl)azo)-tetrasodium salt].

Particularly preferred tinting agents for use in the present invention are phthalocyanine pigments such as phthalocyanine blue and phthalocyanine green, chromic-alumina-cobaltous oxide, chromium oxides, and various iron oxides for red, yellow, brown and black colors. Generally, if employed, a tinting agent will comprise from about 0.05 to about 0.5 percent by weight of the composition, or preferably, from about 0.07 to about 0.3 percent by weight of the composition. Illustrative weight percentages of a tinting agent, e.g., a phthalocyanine pigment, include the following: 0.05, 0.06, 0.07, 0.08, 0.09, 0.1, 0.2, 0.3, 0.4, 0.5, and the like. Opaquing agents such as titanium dioxide may also be incorporated. For certain applications, a mixture of colors may be employed for better simulation of natural iris appearance.

A representative precursor composition comprises, i.e., is produced by combining, from about 30 to 40 percent by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol)propylmethylsiloxane), from about 40 to 50 percent by weight N-vinyl-N-methylacetamide, from about 10 to 25 percent by weight methylmethacrylate, and less than about 5% by weight combined of ethylene glycol dimethacrylate, allyloxy alcohol, 2-hydroxy-4-acryloyloxyethoxy benzophenone, phthalocyanine blue, and 2,2'-azobisisobutyronitrile.

An exemplary precursor composition is provided in Example 1. In a particularly preferred embodiment, a polymerizable composition may comprise, consist essentially of, or consist entirely of the following amounts, in weight percent, of each of the following components: about 34 percent by weight α-ω-bis(methacryloyloxyethyl iminocarboxy ethyloxypropyl)-poly(dimethylsiloxane)-poly (trifluoropropylmethylsiloxane)-poly (ω-methoxy-poly(ethyleneglycol) propylmethylsiloxane), about 46 percent by weight N-vinyl-N-methylacetamide, about 17 percent by weight methylmethacrylate, about 0.5 percent by weight ethylene glycol dimethacrylate, about 1 percent by weight allyloxy alcohol, about 0.9 percent by weight 2-hydroxy-4-acryloyloxyethoxy benzophenone, about 0.1 percent by weight phthalocyanine blue, and about 0.3 percent by weight 2,2'-azobisisobutyronitrile.

Certain embodiments of the present precursor compositions include polymerizable silicone hydrogel contact lens precursor compositions provided in non-polar resin contact lens molds. Other embodiments include such compositions in storage containers, such as bottles and the like, or in dispensing devices, such as manual or automated pipetting devices.

Method of Forming a Silicone Hydrogel Contact Lens

Generally, in producing a silicone hydrogel contact lens, components of a silicone hydrogel contact lens precursor composition are each weighed and then combined. The resulting precursor composition is then typically mixed, e.g., using magnetic or mechanical mixing, and optionally filtered to remove particulates.

The lenses of the invention may be produced, e.g., as illustrated in FIG. 1.

FIG. 1 is a block diagram illustrating a method for producing a silicone hydrogel contact lens. In particular, FIG. 1 illustrates a method of cast molding a silicone hydrogel contact lens. Cast molded contact lenses can be produced per se in a form suitable for direct placement on an eye of a person, without requiring further machining to modify the lens to make the lens suitable for use on an eye. The silicone hydrogel contact lenses of the present invention, produced using a cast molding procedure such as the procedure illustrated in FIG. 1, are considered herein as "cast molded silicone hydrogel contact lenses". The present lenses are understood to be "fully molded silicone hydrogel contact lenses" if no machining is used to alter the lens design after delensing the lens product from a mold member.

Illustrative methods for producing contact lenses, such as silicone hydrogel contact lenses, are described in at least the following: U.S. Pat. Nos. 4,121,896; 4,495,313; 4,565,348; 4,640,489; 4,889,664; 4,985,186; 5,039,459; 5,080,839; 5,094,609; 5,260,000; 5,607,518; 5,760,100; 5,850,107; 5,935,492; 6,099,852; 6,367,929; 6,822,016; 6,867,245; 6,869,549; 6,939,487; and U.S. Patent Publication Nos. 20030125498; 20050154080; and 20050191335.

In turning back to FIG. 1, the process outlined in the block diagram will now be briefly described. The illustrated method includes a step 102 of placing a polymerizable silicone hydrogel lens precursor composition (202, as shown in FIG. 2) on or in a contact lens mold member. The polymerizable silicone hydrogel lens precursor composition refers to a pre-polymerized or pre-cured composition suitable for polymerization. As used herein, the present polymerizable composition may also be referred to as a "monomer mix" or "reaction mixture". Preferably, the polymerizable composition or lens precursor composition is not polymerized to any significant extent before curing or polymerization of the composition. However, in certain instances, a polymerizable composition or lens precursor composition may be partially polymerized before undergoing curing.

The present lens precursor compositions can be provided in containers, dispensing devices, or contact lens molds prior to a curing or polymerization procedure.

Referring back to FIG. 1, step 102, the lens precursor composition is placed on a lens-forming surface of a female contact lens mold member. The female contact lens mold member generally refers to a first contact lens mold member or an anterior contact lens mold member. For example, the female contact lens mold member has a lens-forming surface that defines the anterior or front surface of a contact lens produced from the contact lens mold.

The first contact lens mold member is placed in contact with a second contact lens mold member to form a contact lens mold having a contact lens shaped cavity. Therefore, the method illustrated in FIG. 1 includes a step 104 of closing a contact lens mold by placing two contact lens mold members in contact one another to form a contact lens shaped cavity. The polymerizable silicone hydrogel lens precursor composition 202 is located in the contact lens shaped cavity. The second contact lens mold member refers to be a male contact lens mold member or a posterior contact lens mold member. For example, the second contact lens mold member includes a lens-forming surface that defines the posterior surface of a contact lens produced in the contact lens mold.

As used herein, a "non-polar resin contact lens mold" or "hydrophobic resin contact lens mold" refers to a contact lens mold that is formed or produced from a non-polar or hydrophobic resin. Thus, a non-polar resin based contact lens mold can comprise a non-polar or hydrophobic resin. For example, such contact lens molds can comprise one or more polyolefins, or can be formed from a polyolefin resin material. Examples of non-polar resin contact lens molds used in the context of the present application include polyethylene contact lens molds, polypropylene contact lens molds, and polystyrene contact lens molds. Non-polar resin based contact lens molds typically have hydrophobic surfaces. For example, a non-polar resin mold or a hydrophobic resin mold may have a static contact angle of about 90 degrees or more, as determined using the captive bubble method. With such contact angles, conventional silicone hydrogel contact lenses produced in such molds have clinically unacceptable surface wettabilities.

The method further includes curing 106 the polymerizable silicone hydrogel lens precursor composition to form a pre-extracted polymerized silicone hydrogel contact lens product 204, as shown in FIG. 2. During curing, the lens forming components of the polymerizable silicone hydrogel lens precursor composition polymerize to form a polymerized lens product. Thus, curing may also be understood to be a polymerizing step. The curing 106 may include exposing the polymerizable lens precursor composition to radiation, such as heat, or any other means effective to polymerize the components of the lens precursor composition. For example, the curing 106 may include exposing the polymerizable lens precursor composition to polymerizing amounts of heat or ultraviolet (UV) light, among other things. Curing may optionally be carried out in an oxygen-free environment. For example, curing may be carried out under an inert atmosphere, e.g., under nitrogen, argon, or other inert gases. In one particular embodiment, curing comprises heating a polymerizable composition as provided herein to a temperature greater than about 55° C.

The pre-extracted polymerized silicone hydrogel contact lens product 204 refers to a polymerized product prior to undergoing an extraction procedure that removes substantially all of the removable/extractable component(s) from the polymerized product. Pre-extracted polymerized silicone hydrogel contact lens products can be provided on or in contact lens molds, extraction trays, or other devices prior to being contacted by an extraction composition. For example, a pre-extracted polymerized silicone hydrogel contact lens product may be provided in a lens shaped cavity of a contact lens mold after a curing procedure, may be provided on or in one contact lens mold member after demolding of the contact lens mold, or may be provided on or in an extraction tray or other device after a delensing procedure and prior to an extraction procedure. The pre-extracted polymerized silicone hydrogel contact lens product includes a lens forming component, such as a silicon-containing polymeric network or matrix in the shape of a lens, and a removable component that can be removed from the lens forming component. The removable component includes unreacted monomers, oligomers, partially reacted monomers, or other agents which have not become covalently attached or otherwise immobilized relative to the lens-forming component. The removable component may also include one or more additives, including organic additives, including diluents, that can be extracted from the polymerized lens product during an extraction procedure, as discussed previously. Thus, materials that may comprise the removable component include linear uncross-linked, cross-linked, and or branched polymers of extractable materials that are not cross-linked to or otherwise immobilized relative to the polymer backbone, network, or matrix of the lens body.

In addition, the removable component can include other materials, such as volatile materials, that may be passively or actively removed from the pre-extracted polymerized silicone hydrogel contact lens product prior to extraction. For example, a portion of the removable component may evaporate between the demolding step and the extraction step.

After curing the polymerizable lens precursor compositions, demolding 108 of the contact lens mold is carried out. Demolding refers to the process of separating two mold members, such as male and female mold members, of a mold containing a pre-extracted polymerized contact lens product or polymerized device. The pre-extracted polymerized silicone hydrogel contact lens product is located on one of the demolded mold members. For example, the polymerized silicone hydrogel contact lens product may be located on the male mold member or the female mold member.

The pre-extracted polymerized silicone hydrogel contact lens product 204 is then separated from the contact lens mold member upon which it is located during delensing step 110, as shown in FIG. 1. The pre-extracted polymerized contact lens product can be delensed from the male mold member or the female mold member, depending on which mold member the polymerized contact lens product remains adhered during the demolding of the contact lens mold.

After delensing the pre-extracted silicone hydrogel contact lens products, the method includes extracting 112 extractable materials from the pre-extracted silicone hydrogel contact lens product. The extraction step 112 results in an extracted silicone hydrogel contact lens product 206, as shown in FIG. 2. Extraction step 112 refers to a procedure in which a pre-extracted polymerized silicone hydrogel contact lens product is contacted with one or more extraction compositions, and may involve a single extraction step or several sequential extractions. For example, a polymerized silicone hydrogel contact lens product or a batch of polymerized silicone hydrogel contact lens products is contacted with one or more volumes of a liquid extraction medium or liquid extraction media. The extraction media typically includes one or more solvents. For example, the extraction media include ethanol, methanol, propanol, and other alcohols. Extraction media can also include mixtures of alcohols and water, such as a mixture of 50% ethanol and 50% deionized water, or a mixture of 70% ethanol and 30% deionized water, or a mixture of 90% ethanol and 10% deionized water. Alternatively, the extraction media can be substantially or entirely alcohol free, and may include one or more agents facilitating removal of hydrophobic unreacted components from a polymerized silicone hydrogel lens product. For example, the extraction media can comprise, consist essentially of, or consist entirely of water, buffer solutions, and the like. The extraction 112 can be conducted at various temperatures, including room temperature. For example, extraction can occur at room temperature (e.g., about 20° C.), or it can occur at an elevated temperature (e.g., from about 25° C. to about 100° C.). In addition, in certain embodiments, the extraction step 112 may include contacting the lens products with a mixture of alcohol and water, which may, in certain instances, comprise the last step of a multi-step extraction procedure.

After extracting the pre-extracted polymerized silicone hydrogel contact lens products to provide an extracted polymerized silicone hydrogel contact lens product, the method includes hydrating 114 the extracted polymerized silicone hydrogel contact lens products. The hydrating step 114 may, for example, include contacting an extracted polymerized silicone hydrogel contact lens product or one or more batches of such products with water or an aqueous solution to form a hydrated silicone hydrogel contact lens 208, as shown in FIG. 2. As an example, the extracted polymerized silicone hydrogel contact lens product may be hydrated by placement in two or more separate volumes of water, including deionized water. In certain embodiments, the hydrating step 114 is combined with the extraction step 112 such that both steps are performed at a single station in a contact lens production line. The hydration step 114 may be performed in a container at room temperature, or at an elevated temperature, and if desired, at an elevated pressure. For example, hydration can occur in water at a temperature of about 120° C. (e.g., 121° C.) and at a pressure of 103 kPa (15 psi).

Thus, as evident from the above, the pre-extracted polymerized silicone hydrogel contact lens products and the extracted polymerized silicone hydrogel contact lens products are considered to be water swellable products or elements, and the hydrated silicone hydrogel contact lens is considered to be a product or element that is swollen with water. As used herein, a silicone hydrogel contact lens refers to a silicone hydrogel element that has undergone a hydration step. Thus, a silicone hydrogel contact lens may be a fully hydrated silicone hydrogel contact lens, a partially hydrated silicone hydrogel contact lens, or a dehydrated silicone hydrogel contact lens. A dehydrated silicone hydrogel contact lens refers to a contact lens that has undergone a hydration procedure and has subsequently been dehydrated to remove water from the lens.

After hydrating the extracted silicone hydrogel contact lens product to produce a silicone hydrogel contact lens, the method includes a step 116 of packaging the silicone hydrogel contact lens 208. For example, the silicone hydrogel contact lens 208 can be placed in a blister pack or other suitable container that includes a volume of a liquid, such as a saline solution, including buffered saline solutions. Examples of liquids suitable for the present lenses include phosphate buffered saline and borate buffered saline. The blister pack or container is then sealed, and subsequently sterilized, as shown at step 118. For example, the packaged silicone hydrogel contact lens may be exposed to sterilizing amounts of radiation, including heat, such as by autoclaving, gamma radiation, e-beam radiation, or ultraviolet radiation.

Properties of Silicone Hydrogel Lenses

As discussed above, the compositions and methods provided herein provide ophthalmically compatible silicone hydrogel contact lenses. A pre-extracted polymerized silicone hydrogel lens product is extracted and hydrated to form a silicone hydrogel contact lens having an ophthalmically acceptable surface wettability. The present lenses have an oxygen permeability, a surface wettability, a modulus, a water content, ionoflux, a design, and combinations thereof, which permit the present lenses to be comfortably worn on a patient's eye for extended periods of time, such as for at least a day, at least a week, at least two weeks, or about a month without requiring removal of the lens from the eye.

As used herein, an "ophthalmically compatible silicone hydrogel contact lens" refers to a silicone hydrogel contact lens that can be worn on a person's eye without the person experiencing or reporting substantial discomfort, including ocular irritation and the like. Ophthalmically compatible silicone hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort. A silicone hydrogel contact lens having an ophthalmically acceptable surface wettability refers to a silicone hydrogel contact lens that does not adversely affect the tear film of a lens wearer's eye to a degree that results in the lens wearer experiencing or reporting discomfort associated with placing or wearing the silicone hydrogel contact lens on an eye. Ophthalmically compatible silicone hydrogel contact lenses meet clinical acceptability requirements for daily wear or extended wear contact lenses.

The present silicone hydrogel contact lenses comprise lens bodies that have surfaces, such as an anterior surface and a posterior surface, with ophthalmically acceptable surface wettabilities (OASW). Wettability refers to the hydrophilicity of one or more surfaces of a contact lens. In one measure, a surface of a lens may be considered wettable, or may be considered to possess an ophthalmically acceptable wettability, if the lens receives a score of 3 or above in a wettability assay conducted as follows. A contact lens is dipped into distilled water, removed from the water, and the length of time that it takes for the water film to recede from the lens surface is determined (e.g., water break up time (water BUT, or WBUT)). The assay provides grades for lenses on a linear scale of 1-10, where a score of 10 refers to a lens in which a drop takes 20 seconds or more to recede from the lens. A silicone hydrogel contact lens having a water BUT of more than 5 seconds, such as at least 10 seconds or more desirably at least about 15 seconds, can be considered to possess an ophthalmically acceptable surface wettability, although in vitro assessment of WBUT is only one measure or indication of OASW. Alternatively, OASW can be assessed in vivo. A lens is considered to possess an OASW if the lens can be worn on the eye of a patient for at least six hours without discomfort or irritation reported by the patient.

Wettability can also be determined by measuring a contact angle on one or both lens surfaces. The contact angle can be a dynamic or static contact angle. Lower contact angles generally refer to increased wettability of a contact lens surface. For example, a wettable surface of a silicone hydrogel contact lens as provided herein may have a contact angle less than about 90 degrees. However, in certain embodiments of the present lenses, the lenses have a contact angle no greater than 80 degrees, and in further embodiments, the present silicone hydrogel contact lenses have advancing contact angles less than about 75 degrees, and even more preferably, less than about 70 degrees. In one embodiment, the lenses have advancing contact angles ranging from about 52 to about 62 degrees.

The present silicone hydrogel contact lenses comprise lens bodies having ophthalmically acceptable surface wettabilities. For example, a lens body of the present silicone hydrogel contact lenses typically possesses an anterior surface and a posterior surface, each surface having an ophthalmically acceptable surface wettability.

In one embodiment, a lens body of a silicone hydrogel contact lens comprises a silicone hydrogel material. The lens body has a dry weight no greater than 90% of the dry weight of the lens body prior to extraction. For example, a lens body of pre-extracted polymerized silicone hydrogel contact lens product may have a dry weight of X. After an extraction procedure, the lens body of the extracted polymerized silicone hydrogel contact lens product has a dry weight less than or equal to 0.9X. As discussed above, the pre-extracted polymerized silicone hydrogel contact lens product may, during the extraction step, be contacted with volumes of multiple organic solvents, followed by a hydration step to produce a silicone hydrogel contact lens. The hydrated silicone hydrogel contact lens is then dehydrated and weighed to determine the dry weight of the lens body of the silicone hydrogel contact lens.

For example, in certain methods, a pre-extracted polymerized silicone hydrogel contact lens product is delensed from a contact lens mold member and is weighed to provide the dry weight of the pre-extracted polymerized silicone hydrogel contact lens product. The pre-extracted lens product is then contacted with alcohol for about 6 hours and then is hydrated with water. The hydrated lens is then dried at about 80° C. for about 1 hour, and then dried under a vacuum at about 80° C. for about 2 hours. The dried lens is weighed to determine the dry weight of the lens body of the silicone hydrogel contact lens. The dry weights are then compared to determine the amount of extractable material present in the pre-extracted polymerized silicone hydrogel contact lens product. A pre-extracted polymerized lens product having an extractable component content of about 40% produces a lens body of a silicone hydrogel contact lens having a dry weight that is about 60% of the pre-extracted lens product. A pre-extracted polymerized lens product having an extractable component content of about 70% produces a lens body of a silicone hydrogel contact lens having a dry weight that is about 30% of the pre-extracted lens product, and so forth.

The amount of extractables, or the extractable component content, present in a pre-extracted polymerized silicone hydrogel contact lens product can be determined using the following equation:

$$E = ((\text{Dry weight of the pre-extracted lens product} - \text{Dry weight of extracted and hydrated contact lens}) / \text{Dry weight of the pre-extracted lens product}) \times 100.$$

E is the percentage of extractables present in the pre-extracted lens product.

For example, a pre-extracted polymerized silicone hydrogel contact lens product may have a dry weight of about 20 mg. If a silicone hydrogel contact lens obtained from that product has a dry weight of about 17 mg, that silicone hydrogel contact lens comprises a lens body having a dry weight that is 85% of the dry weight of the pre-extracted lens product. It can be understood that such a pre-extracted lens product has an extractable component content of about 15% (w/w). As another example, a pre-extracted polymerized silicone hydrogel contact lens product may have a dry weight of about 18 mg, and if the dehydrated silicone hydrogel contact lens obtained from the lens product has a dry weight of about 13 mg, the silicone hydrogel contact lens comprises a lens body having a dry weight that is about 72% of the pre-extracted lens product. Such a pre-extracted polymerized silicone hydrogel contact lens product has an extractable component content of about 28% (w/w).

In certain embodiments, the dry weight of the lens body of the silicone hydrogel contact lens (i.e., a silicone hydrogel contact lens that has undergone an extraction and hydration procedure) is greater than 70% of the dry weight of the lens body prior to extraction. For example, the dry weight of the post-extracted lens body may be from about 70% to about 90% of the dry weight of the pre-extracted lens body. Some embodiments of the present lenses comprise lens bodies having a dry weight from about 70% to about 78% of the dry weight of the pre-extracted lens body. In at least one embodiment, a silicone hydrogel contact lens has a dry weight of about 74% of the dry weight of the pre-extracted lens body.

Although the present pre-extracted polymerized silicone hydrogel contact lens products contain extractable materials, the extracted forms of the present silicone hydrogel contact lenses possess very small if not negligible amounts of extractable materials in the resulting lens bodies. In certain embodiments, the amount of extractable materials remaining in an extracted lens is from about 0.1% to about 4%, such as about 0.4% to about 2% (w/w). These additional extractable materials can be determined by contacting an extracted contact lens with an additional volume of a strong solvent, such as chloroform.

In addition, since the extractable component is present in and distributed throughout the polymerizable silicone hydrogel lens precursor composition and the pre-extracted polymerized silicone hydrogel contact lens product, the present lens products and contact lenses can be distinguished from surface treated silicone hydrogel contact lenses. Since the extractable component is extractable from the lens products and is substantially absent from the hydrated contact lens, the present lens products and contact lenses can be distinguished from silicone hydrogel contact lenses that have a polymeric wetting agent IPN.

The present silicone hydrogel contact lenses may comprise lens bodies obtained from non-polar resin contact lens molds that have substantially identical surface morphologies when examined in hydrated and dehydrated states. In addition, such hydrated lens bodies may have a surface roughness that is slightly less than the surface roughness of the dehydrated lens bodies. For example, the lens bodies of the present lenses may have surfaces that include nanometer sized peaks that are apparent when analyzing root mean square (RMS) roughness data of the lens surfaces. The lens bodies may comprise regions between such peaks that differentially swell compared to the peaks to provide a reduced roughness but a substantially similar surface morphology. For example, although the height of the peaks may be reduced as the lens body is hydrated, the shape of the peak remains substantially the same.

In addition or alternatively, embodiments of the present non-polar resin molded silicone hydrogel contact lenses may comprise lens bodies that have visually identifiable silicon-rich domains and silicon-poor domains when viewed with an electron microscope, such as a scanning electron microscope, a transmission electron microscope, or a scanning transmission electron microscope. The silicon-poor domains can be understood to be regions within the lens that are substantially or entirely free of silicon based on chemical analysis. The silicon-poor domains may be larger than such domains in surface treated silicone hydrogel contact lenses or silicone hydrogel contact lenses that comprise an IPN of a polymeric wetting agent. The sizes of the silicon-rich domains, silicon-poor domains, or both may be determined using conventional image analysis software and devices, such as image analysis systems available from Bioquant (Tennessee). The image analysis software systems can be used to outline the borders of the silicon-rich and silicon-poor domains and determine cross-sectional areas, diameters, volumes, and the like of the domains. In certain embodiments, the silicon-poor domains have cross-sectional areas that are at least 50%, at least 60%, at least 70%, at least 80%, or at least 90% greater than silicon-poor domains of other silicone hydrogel contact lenses.

Typically, the present lens bodies are free of a surface treatment that provides an ophthalmically acceptable surface wettability. In other words, a lens body of the present silicone hydrogel contact lenses is, in one embodiment, an un-surface treated lens body. In other words, the lens body is produced without surface treating the lens body to provide an ophthalmically acceptable surface wettability. For example, illustrative lens bodies do not include a plasma treatment or an additional coating provided to make the surface of the lens body more ophthalmically acceptable. While the present lenses have ophthalmically acceptable surface wettabilities, some embodiments may include surface treatments, if desired.

Certain embodiments of the present lenses comprise lens bodies that are cast molded elements obtained from a non-polar resin contact lens mold. A polymerized silicone hydrogel contact lens product refers to a product that was polymerized or cured in a non-polar resin contact lens mold. Or, stated another way, the polymerized silicone hydrogel contact lens product is produced in a non-polar resin contact lens mold. As discussed herein, such contact lens molds are molds that are produced using or are based on non-polar or hydrophobic resin materials. Such materials typically have relatively large contact angles on their lens forming surfaces.

The present lenses may comprise hydrated lens bodies that have an advancing contact angle on an anterior surface, a posterior surface, or anterior and posterior surface less than 90 degrees. Typically, the lens bodies have a lens surface advancing contact angle less than 75 degrees, for example, the lens bodies have a lens surface advancing contact angle of about one of the following, in degrees: 74, 73, 72, 71, 70, 69, 68, 67, 66, 65, 64, 63, 62, 61, 60, 59, 58, 57, 56, 55, 54, 53, 52, 51, or 50. The lens bodies may also have a lens surface receding contact angle less than about 75 degrees. For example, the lens body may have a lens surface receding contact angle of about one of the following, in degrees: 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, or 40. In one or more embodiments, the lens body possesses a receding contact angle from about 40 to about 60 degrees.

The hysteresis, that is the difference between the advancing contact angle and the receding contact angle, is typically from about 5 degrees to about 25 degrees. However, in preferred embodiments, the hysteresis ranges from about 5 to about 15 degrees, although in certain instances, the lenses may possess a hysteresis greater than about 25 degrees and still be clinically acceptable.

The advancing contact angle can be determined using routine methods known to persons of ordinary skill in the art. For example, the advancing contact angles and receding contact angles of the contact lenses can be measured using a conventional drop shape method, such as the sessile drop method or captive bubble method. Advancing and receding water contact angles of silicone hydrogel contact lenses can be determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: "Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481.

As an example, the advancing contact angle and receding contact angle can be determined using a captive bubble method using phosphate buffered saline (PBS; pH=7.2). The lens is flattened onto a quartz surface and rehydrated with PBS for 10 minutes before testing. An air bubble is placed onto a lens surface using an automated syringe system. The size of the air bubble can be increased and decreased to obtain the receding angle (the plateau obtained when increasing the bubble size) and the advancing angle (the plateau obtained when decreasing the bubble size).

The present lenses may, in addition or alternatively, comprise lens bodies that exhibit a water break up time (BUT) greater than 5 seconds. For example, embodiments of the present lenses comprising lens bodies with a water BUT of at least 15 seconds, such as 20 seconds or more, can have ophthalmically acceptable surface wettabilities.

Generally, the present lenses comprise lens bodies having moduli less than 1.6 MPa. Typically, the lenses are characterized by a modulus ranging from about 0.5 to about 1.5, preferably, from about 0.6 to about 1.2 mPa. In one or more embodiments, the lenses possess a moduli ranging from about 0.8 to about 1.0 MPa. For example, the lens body may have a modulus of about 1.2 MPa, 1.1 MPa, 1.0 MPa, 0.9 MPa, 0.8 MPa, about 0.7 MPa, about 0.6 MPa, or about 0.5 MPa. The modulus of the lens body is selected to provide a comfortable lens when placed on an eye and to accommodate handling of the lens by the lens wearer.

The modulus of a lens body can be determined using routine methods known to persons of ordinary skill in the art. For example, pieces of a contact lens having about 4 mm width can be cut out from a central part of lens and tensile modulus (unit; MPa) can be determined from an initial slope of a stress-strain curve obtained by tensile test at the rate of 10 mm/min in air at a humidity of at least 75% at 25° C., using an Instron 3342 (Instron Corporation).

The ionoflux of the lens bodies of the present lenses is typically less than about $5 \times 10^{-3}$ mm$^2$/min. Although the lens body of some of the present lenses may have an ionoflux up to about $7 \times 10^{-3}$ mm$^2$/min, it is believed that when the ionoflux is less than about $5 \times 10^{-3}$ mm$^2$/min and when the contact lenses do not include MPC, corneal dehydration staining can be reduced. In certain embodiments, the ionoflux of the lens body ranges from about $2 \times 10^{-3}$ mm$^2$/min to about $5 \times 10^{-3}$ mm$^2$/min. For example, the ionoflux may be about $2 \times 10^{-3}$ mm$^2$/min, $2.5 \times 10^{-3}$ mm$^2$/min, $3.0 \times 10^{-3}$ mm$^2$/min, $3.5 \times 10^{-3}$ mm$^2$/min, $4.0 \times 10^{-3}$ mm$^2$/min, $4.5 \times 10^{-3}$ mm$^2$/min, or about $5 \times 10^{-3}$ mm$^2$/min. However, as described herein, the ionoflux may be greater than $7 \times 10^{-3}$ mm$^2$/min and still not cause corneal dehydration staining or other clinical problems.

The ionoflux of the lens bodies of the present lenses can be determined using routine methods known to persons of ordinary skill in the art. For example, the ionoflux of a contact lens or lens body can be measured using a technique substantially similar to the "Ionoflux Technique" described in U.S. Pat. No. 5,849,811. For example, the lens to be measured can be placed in a lens-retaining device, between male and female portions. The male and female portions include flexible sealing rings which are positioned between the lens and the respective male or female portion. After positioning the lens in the lens-retaining device, the lens-retaining device is placed in a threaded lid. The lid is screwed onto a glass tube to define a donor chamber. The donor chamber can be filled with 16 ml of 0.1 molar NaCl solution. A receiving chamber can be filled with 80 ml of deionized water. Leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber. Measurements of conductivity can be taken every 2 minutes for about 20 minutes, starting 10 minutes after immersion of the donor chamber into the receiving chamber. The conductivity versus time data should be substantially linear.

The lens bodies of the present lenses typically have a high oxygen permeability. For example, the lens bodies have an oxygen permeability of Dk no less than 60 barrers. Embodiments of the present lenses comprise a lens body having a Dk of about 80 barrers, about 90 barrers, about 100 barrers, about 110 barrers, about 120 barrers, about 130 barrers, about 140 barrers, or more. Preferably, the lenses have a Dk of about 70 to about 110 barrers, and more preferably, from about 80 to 100 barrers.

The Dk of the present lenses can be determined using routine methods known to persons of ordinary skill in the art. For example, the Dk value can be determined using the Mocon Method, as described in U.S. Pat. No. 5,817,924. The Dk values can be determined using a commercially available instrument under the model designation of Mocon Ox-Tran System.

The present lenses also comprise lens bodies having ophthalmically acceptable water contents. For example, embodiments of the present lenses comprise lens bodies having an equilibrium water content of no less than about 30%. In certain embodiments, the lens body has an equilibrium water content ranging from about 40 to about 60% by weight. For example, the lenses provided herein may possess an equilibrium water content of about 35%, about 40%, about 45%, about 50%, about 55%, about 60%, or even about 65%. In one or more embodiments, the lens bodies possess an equilibrium water content from about 42% to about 50% by weight.

The water content of the present lenses can be determined using routine methods known to persons of ordinary skill in the art. For example, a hydrated silicone hydrogel contact lens can be removed from an aqueous liquid, wiped to remove excess surface water, and weighed. The weighed lens can then be dried in an oven at 80 degrees C. under a vacuum, and the dried lens can then be weighed. The weight difference is determined by subtracting the weight of the dry lens from the weight of the hydrated lens. The water content (%) is the (weight difference/hydrated weight)×100.

In addition to the specific values identified above, the present lenses may possess values in a range between any combinations of the above-identified specific values.

For example, the present contact lenses can have water contents from about 42% to about 50%, ionoflux values from about 3 to about 5 ($\times 10^{-3}$ mm$^2$/min), advancing contact angles from about 52 degrees to about 62 degrees, receding contact angles from about 40 degrees to about 60 degrees, hysteresis from about 5 degrees to about 15 degrees, Young's moduli from about 0.6 MPa to about 1.2 MPa, elongation at least about 100%, and combinations thereof. In certain embodiments, the elongation is from about 100% to about 300%.

As discussed herein, the present lenses have features and properties that permit the lenses to be worn for prolonged periods of time. For example, the present lenses can be worn as daily wear lenses, weekly wear lenses, bi-weekly wear lenses, or monthly wear lenses. The present lenses comprise hydrated lens bodies that have surface wettabilities, moduli, ionofluxes, oxygen permeabilities, and water contents that contribute to the comfort and usability of the lenses.

The present silicone hydrogel contact lenses are vision correcting or vision enhancing contact lenses. The lenses may be spheric lenses or aspheric lenses. The lenses may be monofocal lenses or multifocal lenses, including bifocal lenses. In certain embodiments, the present lenses are rotationally stabilized lenses, such as a rotationally stabilized toric contact lens. A rotationally stabilized contact lens may be a contact lens that comprises a lens body that includes a ballast. For example, the lens body may have a prism ballast, a periballast, and/or one or more thinned superior and inferior regions.

The present lenses also comprise lens bodies that include a peripheral edge region. The peripheral edge region may include a rounded portion. For example, the peripheral edge region may comprise a rounded posterior edge surface, a rounded anterior edge surface, or a combination thereof. In certain embodiments, the peripheral edge is completely rounded from the anterior surface to the posterior surface. Therefore, it can be understood that the lens body of the present lenses may comprise a rounded peripheral edge.

The present lenses may comprise lens bodies with thickness profiles that address problems associated with existing silicone hydrogel contact lenses but that are still comfortable to the lens wearer. By varying the thicknesses of the lens bodies and the moduli of the lens bodies, the stiffness of the lens bodies can be controlled. For example, the stiffness for a region of a contact lens can be defined as the product of the Young's modulus of the lens and the square of the thickness of the lens at a specified region. Thus, certain embodiments of the present lenses may comprise lens bodies having a center stiffness (e.g., the stiffness at the center of the lens or center of the optic zone) less than about 0.007 MPa-mm$^2$, a lenticular junction stiffness less than about 0.03 MPa-mm$^2$, or a combination thereof. A lenticular junction can be defined as the junction of the lenticular zone with a bevel or, for lenses without a bevel, a point about 1.2 mm from the lens edge (see U.S. Pat. No. 6,849,671). In other embodiments, the present lenses may comprise lens bodies having a center stiffness greater than 0.007 MPa-mm$^2$, a lenticular junction stiffness greater than about 0.03 MPa-mm$^2$, or a combination thereof.

The present silicone hydrogel contact lenses may be provided in a sealed package. For example, the present silicone hydrogel contact lenses may be provided in sealed blister packs or other similar containers suitable for delivery to lens wearers. The lenses may be stored in an aqueous solution, such as a saline solution, within the package. Some suitable solutions include phosphate buffered saline solutions and borate buffered solutions. The solutions may include a disinfecting agent if desired, or may be free of a disinfecting or preservative agent. The solutions may also include a surfactant, such as a poloxamer, and the like, if desired.

The lenses in the sealed packages are preferably sterile. For example, the lenses can be sterilized prior to sealing the package or can be sterilized in the sealed package. The sterilized lenses may be lenses that have been exposed to sterilizing amounts of radiation. For example, the lenses may be autoclaved lenses, gamma radiated lenses, ultraviolet radiation exposed lenses, and the like.

EXAMPLES

The following examples illustrate certain aspects and advantages of the present invention, however, the present invention is in no way considered to be limited to the particular embodiments described below.

The practice of the invention will employ, unless otherwise indicated, conventional techniques of polymer synthesis, hydrogel formation, and the like, which are within the skill of the art. Such techniques are fully explained in the literature. Reagents and materials are commercially available unless specifically stated to the contrary.

Methods for preparing contact lenses, e.g., silicone hydrogel contact lenses, are further described in the following: U.S. Pat. Nos. 4,121,896; 4,495,313; 4,565,348; 4,640,489; 4,889,664; 4,985,186; 5,039,459; 5,080,839; 5,094,609; 5,260,000; 5,607,518; 5,760,100; 5,850,107; 5,935,492; 6,099,852; 6,367,929; 6,822,016; 6,867,245; 6,869,549; 6,939,487; and U.S. Patent Publication Nos. 20030125498; 20050154080; and 20050191335.

In the following examples, efforts have been made to ensure accuracy with respect to numbers used (e.g., amounts, temperatures, etc.) but some experimental error and deviation should be accounted for. Unless indicated otherwise, temperature is in degrees C and pressure is at or near atmospheric pressure at sea level.

The following well-known chemicals are referred to in the examples, and may, in some instances, be referred to by their abbreviations as set forth below.

Materials and Methods
  Abbreviations
  AE: allyloxy ethanol
  DI: deionized
  MMA: methyl methacrylate
  M3U: M3-U; α-ω-Bis(methacryloyloxyethyl iminocarboxy ethyloxypropyl)-poly(dimethylsiloxane)-poly(trifluoropropylmethylsiloxane)-poly (ω-methoxy-poly(ethyleneglycol)propylmethylsiloxane); dimethacryloyl silicone-containing macromer
  M3U used in the following examples is represented by the following formula where n is 121, m is 7.6, h is 4.4, p is 7.4, and the Mn=12,800, and the Mw=16,200 (Asahikasei Aime Co., Ltd., Japan).

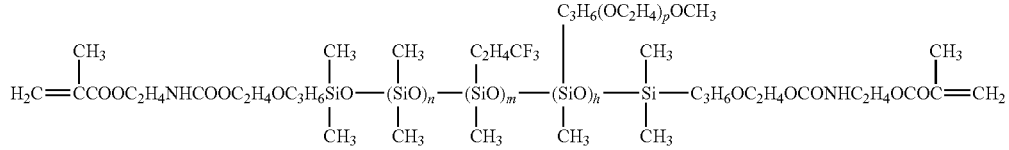

M3U Tint: dispersion of beta Cu-phthalocyanine in M3U (% w/w). The Cu-phthalocyanine is available as Heliogen Blue K7090 from BASF.
N,N-DMF: DMF; N,N-dimethylformamide
NVP: 1-vinyl-2-pyrrolidone (freshly distilled under a vacuum)
PDMS: polydimethylsiloxane
PDMS-co-PEG: block copolymer of polydimethylsiloxane and PEG containing 75% PEG and MW of 600 (DBE712 from Gelest)
PEG: polyethylene glycol
PP: propylpropylene
EGDMA: ethylene glycol dimethacrylate
TEGDVE: triethylene glycol divinyl ether
TPTMA: trimethylol propane trimethacrylate
UV416: 2-(4-benzoyl-3-hydroxyphenoxy)ethyl acrylate
Vazo-64: azo-bis-isobutyronitrile (V-64; thermal initiator)
VMA: N-vinyl-N-methylacetamide (freshly distilled under a vacuum)
VM: vinyl methacrylate Methods for Characterizing Lens Products
  Advancing Contact Angle/Receding Contact Angle.
  The advancing contact angle can be determined using routine methods known to persons of ordinary skill in the art. For example, the advancing contact angles and receding contact angles of the contact lenses provided herein can be measured using a conventional drop shape method, such as the sessile drop method or captive bubble method. Advancing and receding water contact angles of silicone hydrogel contact lenses can be determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: "Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481.

As an example, the advancing contact angle and receding contact angle can be determined using a captive bubble method using phosphate buffered saline (PBS; pH=7.2). The lens is flattened onto a quartz surface and rehydrated with PBS for 10 minutes before testing. An air bubble is placed onto a lens surface using an automated syringe system. The size of the air bubble can be increased and decreased to obtain the receding angle (the plateau obtained when increasing the bubble size) and the advancing angle (the plateau obtained when decreasing the bubble size).

Modulus.

The modulus of a lens body can be determined using routine methods known to persons of ordinary skill in the art. For example, pieces of a contact lens having about 4 mm width can be cut out from a central part of a lens, and tensile modulus (unit; MPa) can be determined from an initial slope of a stress-strain curve obtained by the tensile test at the rate of 10 mm/min in air at a humidity of at least 75% at 25° C., using an Instron 3342 (Instron Corporation).

Ionoflux.

The ionoflux of the lens bodies of the present lenses can be determined using routine methods known to persons of ordinary skill in the art. For example, the ionoflux of a contact lens or lens body can be measured using a technique substantially similar to the "Ionoflux Technique" described in U.S. Pat. No. 5,849,811. For example, the lens to be measured can be placed in a lens-retaining device, between male and female portions. The male and female portions include flexible sealing rings which are positioned between the lens and the respective male or female portion. After positioning the lens in the lens-retaining device, the lens-retaining device is placed in a threaded lid. The lid is screwed onto a glass tube to define a donor chamber. The donor chamber can be filled with 16 ml of 0.1 molar NaCl solution. A receiving chamber can be filled with 80 ml of deionized water. Leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber. Measurements of conductivity can be taken every 2 minutes for about 20 minutes, starting 10 minutes after immersion of the donor chamber into the receiving chamber. The conductivity versus time data should be substantially linear.

Oxygen Permeability.

The Dk of the present lenses can be determined using routine methods known to persons of ordinary skill in the art. For example, the Dk value can be determined using the Mocon Method, as described in U.S. Pat. No. 5,817,924. The Dk values can be determined using a commercially available instrument under the model designation of Mocon Ox-Tran System.

Equilibrium Water Content.

The water content of the present lenses can be determined using routine methods known to persons of ordinary skill in the art. For example, a hydrated silicone hydrogel contact lens can be removed from an aqueous liquid, wiped to remove excess surface water, and weighed. The weighed lens can then be dried in an oven at 80 degrees C. under a vacuum, and the dried lens can then be weighed. The weight difference is determined by subtracting the weight of the dry lens from the weight of the hydrated lens. The water content (%) is the (weight difference/hydrated weight)×100.

Example 1

Preparation of a Polymerizable Silicone Hydrogel Contact Lens Precursor Composition A polymerizable silicone hydrogel contact lens precursor composition was prepared using the reagents and relative amounts specified below. This formulation is referred to herein as a "HM" formulation.

TABLE 1

| Chemical Compound (Abbrev.) | Unit amount (parts) | Wt % (w/w) |
| --- | --- | --- |
| M3U | 35 | 34.3 |
| VMA | 47 | 46.1 |
| MMA | 17 | 16.7 |
| EGDMA | 0.5 | 0.49 |
| AE | 1.1 | 1.1 |
| UV416 | 0.9 | 0.88 |
| TINT (PB15; pthalocyanine blue, m3u blue) | 0.1 | 0.10 |
| VAZO-64 | 0.3 | 0.29 |
| Total | 101.9 parts | |

The components in Table 1 were weighed and mixed to form a mixture. The mixture was filtered through a 0.2-20.0 micron syringe filter into a bottle, and stored for up to about 2 weeks. (This mixture is referred to herein as a polymerizable silicone hydrogel contact lens precursor composition). In Table 1, unit amounts of each compound are provided in addition to their respective weight percents (indicated on a weight by weight basis; w/w). Since the relative parts of each component add up to a total that is close to one hundred, in this instance, weight percentage and relative parts of each component are essentially the same. The ratio of MMA to VMA in the polymerizable composition is 0.36 to 1.

Example 2

Silicone Hydrogel Contact Lens Fabrication

A volume of the precursor composition from Example 1 was degassed using a repeat vacuum/nitrogen flush procedure. The degassed precursor composition was then placed into female non-polar resin mold members. The filled female mold members were then closed by placing in contact with non-polar resin male mold members at a desired pressure to achieve a tight fit. Curing was then carried out in a nitrogen batch oven at the following cycle: 30 min $N_2$ purging at room temperature, 60 min at 65° C. and 30 min at 100° C. Demolding was carried out by striking the female mold member of the contact lens mold so that the male mold member was released therefrom with the polymerized silicone hydrogel contact lens product adhered to the male mold member. Delensing was carried out either by the float off method or using mechanical delensing equipment. The float off method involves soaking the male mold member containing the dry lens in a bucket of water. Typically, the lenses come off of the molds in about ten minutes. Mechanical delensing was carried out by compressing and rotating a male mold member having a polymerized silicone hydrogel contact lens product adhered thereto, directing gas between the contact lens product and the rotating male mold member, and applying a vacuum to the exposed surface of the contact lens product. The separated lenses were then loaded onto plastic trays for extraction and hydration.

Lens trays containing polymerized silicone hydrogel contact lens products were immersed in a solvent liquid, such as industrial methylated spirits (IMS) containing 95% ethanol and 5% methanol, for 45 min at room temperature. The solvent was then drained and replaced with fresh IMS, and the process repeated with IMS (3×), 1:1 alcohol/water (1×), and with DI water (3×).

The hydrated lenses were stored in glass vials or in blister packages containing DI water or in phosphate buffer saline at pHs from 7.1-7.5. The sealed containers were autoclaved at 121° C. for 30 min. Lens measurements were taken following 24 h of autoclaving. The resulting hydrated silicone hydrogel contact lenses were weighed, and then dehydrated in an oven and weighed again to determine the dry weight of the dehydrated silicone hydrogel contact lens.

Lens properties such as contact angle, including dynamic and static contact angle, oxygen permeability, ionoflux, modulus, elongation, tensile strength, water content, and the like were determined, as described herein. Wettability of the hydrated silicone hydrogel contact lenses was also examined by measuring the water break up time for the lenses.

Ophthalmic compatibility was further examined during dispensing studies in which a contact lens was placed on an eye of a person for 1 hour, 3 hours, or 6 hours or more, and clinical assessments then made.

The silicone hydrogel contact lenses resulting from the instant formulation had ophthalmically acceptable surface wettabilities. These silicone hydrogel contact lenses possessed equilibrium water concentrations (EWC) of 44-47%, and were determined to possess an extractable content of about 26% (wt/wt).

The resulting hydrated contact lenses possessed the following properties:

TABLE 2

| Property | Value |
| --- | --- |
| Equilibrium water content (EWC) | 45-47% |
| Oxygen Permeability ($D_k$) | 91 barrers |
| Static contact angle (Captive bubble wetting angle) | 36-38 degrees |
| Dynamic contact angle (Advancing contact angle) | 58 degrees |
| Dynamic Contact Angle (Receding Contact Angle) | 50 degrees |
| Hysteresis (Advancing-Receding) | 8 degrees |
| Refractive Index | 1.40 |
| Ionflux | 3-4 |
| Modulus | 0.8-1.0 MPa |
| Tensile Strength | 0.6-0.7 MPa |

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed herein, as such are presented by way of example. The intent of the foregoing detailed description, although discussing exemplary embodiments, is to be construed to cover all modifications, alternatives, and equivalents of the embodiments as may fall within the spirit and scope of the invention as defined by the additional disclosure.

Although specific terms are employed herein, they are used in a generic and descriptive sense only and not for purposes of limitation.

A number of publications and patents have been cited hereinabove. Each of the cited publications and patents are hereby incorporated by reference in their entireties.

What is claimed is:

1. A polymerizable composition comprising α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), N-vinyl-N-methylacetamide, methylmethacrylate, ethylene glycol dimethacrylate, allyloxy alcohol, and a free radical initiator, which when formed into a lens body has an equilibrium water content of from about 40% to about 65% by weight, characterized in that at least one of the following conditions are met: (i) about 34 percent by weight α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), (ii) about 46 percent by weight N-vinyl-N-methylacetamide, (iii) about 17 percent by weight methylmethacrylate, (iv) about 0.5 percent by weight ethylene glycol dimethacrylate, and (v) about 1 percent by weight allyloxy alcohol.

2. The polymerizable composition of claim 1, further comprising an ultraviolet absorber, a tinting agent, or a combination thereof.

3. The polymerizable composition of claim 2, wherein said ultraviolet absorber is 2-hydroxy-4-acryloyloxyethoxy benzophenone.

4. The polymerizable composition of claim 2, wherein said tinting agent is a phthalocyanine pigment.

5. The polymerizable composition of claim 1, wherein said free radical initiator is 2,2'-azobisisobutyronitrile.

6. The polymerizable composition of claim 1, further comprising one or more of the following: (vi) about 0.9 percent by weight 2-hydroxy-4-acryloyloxyethoxy benzophenone, (vii) about 0.1 percent by weight phthalocyanine blue, and (viii) about 0.3 weight percent free radical initiator.

7. The polymerizable composition of claim 1, comprising about 34 percent by weight α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), about 46 percent by weight N-vinyl-N-methylacetamide, about 17 percent by weight methylmethacrylate, about 0.5 percent by weight ethylene glycol dimethacrylate, about 1 percent by weight allyloxy alcohol, about 0.9 percent by weight 2-hydroxy-4-acryloyloxyethoxy benzophenone, about 0.1 percent by weight phthalocyanine blue, and about 0.3 percent by weight 2,2'-azobisisobutyronitrile.

8. The polymerizable composition of claim 1, absent a polyalkylene oxide silicone extractable component.

9. A silicone hydrogel contact lens produced from a polymerizable composition comprising α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), N-vinyl-N-methylacetamide, methylmethacrylate, ethylene glycol dimethacrylate, allyloxy alcohol, and a free radical initiator, characterized in that at least one of the following conditions are met: (i) about 34 percent by weight α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), (ii) about 46 percent by weight N-vinyl-N-methylacetamide, (iii) about 17 percent by weight methylmethacrylate, (iv) about 0.5 percent by weight ethylene glycol dimethacrylate, and (v) about 1 percent by weight allyloxy alcohol.

10. A silicone hydrogel contact lens formed from a composition comprising α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), N-vinyl-N-methylacetamide, methylmethacrylate, ethylene glycol dimethacrylate, allyloxy alcohol, and a free radical initiator and said lens substantially free of extractable components, characterized in that at least one of the following conditions are met: (i) about 34 percent by weight α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), (ii) about 46 percent by weight N-vinyl-N-methylacetamide, (iii) about 17 percent by weight methylmethacrylate, (iv) about 0.5 percent by weight ethylene glycol dimethacrylate, and (v) about 1 percent by weight allyloxy alcohol.

11. A silicone hydrogel contact lens produced by polymerizing a polymerizable composition comprising α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), N-vinyl-N-methylacetamide, methylmethacrylate, ethylene glycol dimethacrylate, allyloxy alcohol, and a free radical initiator to form a pre-extracted polymerized silicone hydrogel contact lens comprising extractable components, extracting said extractable components from the pre-extracted contact lens to form an extracted polymerized lens product, and hydrating the extracted polymerized lens product to form a silicone hydrogel contact lens, characterized in that at least one of the following conditions are met: (i) about 34 percent by weight α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), (ii) about 46 percent by weight N-vinyl-N-methylacetamide, (iii) about 17 percent by weight methylmethacrylate, (iv) about 0.5 percent by weight ethylene glycol dimethacrylate, and (v) about 1 percent by weight allyloxy alcohol.

12. The silicone hydrogel contact lens of claim 11, having an equilibrium water content in the range of about 42% to about 50% by weight and an oxygen permeability ($D_k \times 10^{-11}$) ranging from about 80-100 barrers.

13. The silicon hydrogel contact lens of claim 11, having a modulus from about 0.6 to about 1.2 MPa.

14. The silicone hydrogel contact lens of claim 11, wherein said polymerizing comprises heating the polymerizable composition to a temperature greater than about 55° C.

15. A non-surface treated silicone hydrogel contact lens of claim 11.

16. A method for producing a polymerizable silicone hydrogel contact lens precursor composition, said method comprising combining α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), N-vinyl-N-methylacetamide, methylmethacrylate, ethylene glycol dimethacrylate, allyloxy alcohol, and a free radical initiator, to thereby produce a polymerizable silicone hydrogel contact precursor composition, wherein said combining step comprises combining about 34 percent by weight α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), about 46 percent by weight N-vinyl-N-methylacetamide, about 17 percent by weight methylmethacrylate, about 0.5 percent by weight ethylene glycol dimethacrylate, about 1 percent by weight allyloxy alcohol, about 0.9 percent by weight 2-hydroxy-4-acryloyloxyethoxy benzophenone, about 0.1 percent by weight phthalocyanine blue, and about 0.3 percent by weight 2.2'-azobisisobutyronitrile.

17. The method of claim 16, further comprising in said combining step, an ultraviolet absorber, a tinting agent, or a combination thereof.

18. The method of claim 17, wherein said ultraviolet absorber is 2-hydroxy-4-acryloyloxyethoxy benzophenone and said tinting agent is a phthalocyanine pigment.

19. The method of claim 16, further comprising polymerizing the polymerizable lens precursor composition to form a pre-extracted polymerized silicone hydrogel contact lens.

20. The method of claim 19, further comprising placing said polymerizable lens precursor composition prior to said polymerizing in a non-polar resin contact lens mold.

21. The method of claim 20, further comprising extracting the pre-extracted polymerized contact lens to form an extracted polymerized lens product substantially absent extractable components, and hydrating the extracted polymerized lens product to form a silicone hydrogel contact lens.

22. The polymerizable composition of claim 1, wherein said lens body had at least 10% (w/w) extractables removed by extraction.

23. A silicone hydrogel contact lens produced from a polymerizable composition comprising α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), N-vinyl-N-methylacetamide, methylmethacrylate, ethylene glycol dimethacrylate, allyloxy alcohol, and a free radical initiator, wherein said lens had at least 10% (w/w) extractables removed by extraction, characterized in that at least one of the following conditions are met: about 34 percent by weight α-ω-bis(methacryloyloxyethyl iminocarboxy ethyloxypropyl)-poly(dimethylsiloxane)-poly(trifluoropropylmethylsiloxane)-poly(ω-methoxy-poly(ethyleneglycol)propylmethylsiloxane), (ii) about 46 percent by weight N-vinyl-N-methylacetamide, (iii) about 17 percent by weight methylmethacrylate, (iv) about 0.5 percent by weight ethylene glycol dimethacrylate, and (v) about 1 percent by weight allyloxy alcohol.

* * * * *